United States Patent [19]

Lang et al.

[11] Patent Number: 5,202,913
[45] Date of Patent: Apr. 13, 1993

[54] COMMUNICATIONS UNIT FOR FITTING IN VEHICLES

[75] Inventors: Ulf Lang, Lödöse; John-Gustaf Gudmundson, Trollhättan, both of Sweden

[73] Assignee: Saab Automobile Aktiebolag, Sweden

[21] Appl. No.: 720,537

[22] PCT Filed: Dec. 29, 1989

[86] PCT No.: PCT/SE89/00753
§ 371 Date: Jun. 20, 1991
§ 102(e) Date: Jun. 20, 1991

[87] PCT Pub. No.: WO90/07833
PCT Pub. Date: Jul. 12, 1990

[30] Foreign Application Priority Data
Dec. 30, 1988 [SE] Sweden .................... 8804719

[51] Int. Cl.⁵ .................... H04M 11/00; H04M 1/00
[52] U.S. Cl. .................... 379/58; 379/56; 379/419; 455/345
[58] Field of Search .................... 379/56, 58, 419, 426, 379/428, 440, 454, 455; 455/345

[56] References Cited

U.S. PATENT DOCUMENTS

| | | | |
|---|---|---|---|
| 4,056,696 | 11/1977 | Meyerle et al. | 379/419 |
| 4,698,838 | 10/1987 | Ishikawa et al. | 379/58 |
| 4,747,135 | 5/1988 | Banko | 379/436 |

FOREIGN PATENT DOCUMENTS 3402597 8/1985 Fed. Rep. of Germany ........ 379/56

OTHER PUBLICATIONS

MOTOROLA, "DYNA TAC Cellular Mobile Telephone" Aug. 31, 1983.

Primary Examiner—Curtis Kuntz
Assistant Examiner—William D. Cumming
Attorney, Agent, or Firm—Ostrolenk, Faber, Gerb & Soffen

[57] ABSTRACT

A communications unit with a telephone receiver is intended for fitting in a standardized recess for radio equipment in vehicles. The telephone receiver in a first user position lies protected in the recess. By use of an automatic or manually initiated ejection, the telephone receiver is caused to take up a second user position in which the receiver has another orientation and a more advanced position relative to the recess. In this second position the telephone receiver can be picked up from a telephone receiver holder for manual handling. The invention permits a safer handling of the telephone while driving, and without obstructing the accessibility to other vehicle controls in the vicinity of the recess when the telephone receiver is in its first user position.

17 Claims, 4 Drawing Sheets

COMMUNICATIONS UNIT FOR FITTING IN VEHICLES

The invention relates to a communications unit for fitting in a vehicle, and particularly in a recess in the vehicle and for moving out of the recess to a use position.

PRIOR ART

When fitting a mobile telephone in a vehicle, problems often arise in choosing the position of the base unit of the mobile telephone and its telephone receiver. A number of solutions for telephone receiver holders are known which, on the one hand, are intended to afford good accessibility for the vehicle driver when the latter wishes to take the telephone receiver out of the holder and which, on the other hand, are intended to hold the telephone receiver in a storage position.

A conventional position for the telephone receiver holder is on the central console between the driver's seat and the passenger seat. German Patent DE 2,822,378 shows such a positioning, in which the holder is arranged in the central console under a displaceable cover, and in which the telephone receiver is lifted up by a spring when the cover is drawn aside. U.S. Pat. No. 4,640,542 shows an alternative solution for positioning between the driver's seat and the passenger seat, where the telephone receiver can be lifted up from a first storage position to a second user position. However, such a positioning of the telephone receiver on or in the central console requires a sufficiently free space on the central console on which there are also arranged vehicle controls such as, for example, the handbrake, gearstick and maneuvring members for electric windows. The positioning of these controls has higher priority than the positioning of the mobile telephone, which often means that the telephone receiver must be positioned at a location with poor accessibility. The positioning on the central console is also a dangerous alternative from the point of view of road safety, especially when the driver wishes to dial a telephone number with the telephone receiver in the holder and is then forced to take his eyes off the road to a point between the vehicle seats.

Other telephone receiver holders which are positioned on top of the vehicle's instrument panel or on the side of the central console can be of a type similar to that which is described in French Patent Application FR 2,595,890, or in one of Americal Patents U.S. Pat. Nos. 3,889,071, 4,476,354 or 4,609,790. These positions are also unfavourable since a positioning on top of the instrument panel can obstruct part of the view, and a positioning on the side of the central console encroaches on the leg room and results in sharp surfaces on which the legs can strike.

In a further known positioning alternative, use is made of a recess of standardized form prepared in the instrument panel, intended for an ashtray, a storage recess or for extra equipment such as a radio set or the like. The box-shaped base unit of the mobile telephone is in this respect designed in such a way that it can be fitted in the recess and in such a way that a telephone receiver holder can be secured to the side of the base unit facing towards the coupe. The telephone receiver is thus orientated across the opening of the recess. Such a fitting is used for example for mobile telephones sold in Sweden under the trademark MITSUBISHI and with the type designation FM 91D1-5-A. MITSUBISHI's telephone receiver holder comprises a universal joint which means that the telephone receiver can be turned manually to selected positions. However, the universal joint requires enough space between the base unit and the telephone receiver so that the telephone receiver is held in a position at a considerable distance from the level of the instrument panel. U.S. Pat. No. 4,617,430 shows an alternative of a universal joint suspension of the telephone receiver, in which the universal joint itself is mounted on the car interior trim panels. The telephone receiver cannot therefore be positioned with its holder in a position recessed in the instrument panel and protecting the telephone receiver.

OBJECT OF THE INVENTION

The present invention is intended to permit a road-safe handling of a mobile telephone fitted in a prepared recess in the instrument panel, where the mobile telephone in a first user position is stored in a protected position without obstructing other operating controls accessible to the driver, and making it possible, by means of a simple initiating manipulation, to transfer the telephone receiver to a second user position in which the telephone receiver is given another orientation relative to the driver and, if so desired, can also be lifted out from the holder. To this end, the mobile telephone unit according to the invention is characterized by the features which are briefly described below. The communications unit, such as a telephone, fits in and extends horizontally in a recess, and particularly a recess in the instrument panel of the vehicle. There is a base unit which ejects the communications unit or telephone receiver from the recess. During ejection, guide means rotate the communications unit to a use position, so that the receiver both moves out of the recess and rotates to the use position. The ejection may be caused by a motor or by a spring.

In alternative and advantageous embodiments of the mobile telephone unit according to the invention, the initiating manipulation can trigger the dislodging of the telephone to the second user position by starting-up of an electric motor or release of a preloaded spring.

Other features characterizing the invention will emerge from the patent claims and from the following description of an embodiment of the mobile telephone unit according to the invention. In the description reference is made to the attached figures.

DESCRIPTION OF THE PREFERRED EMBODIMENT

Figure 1:
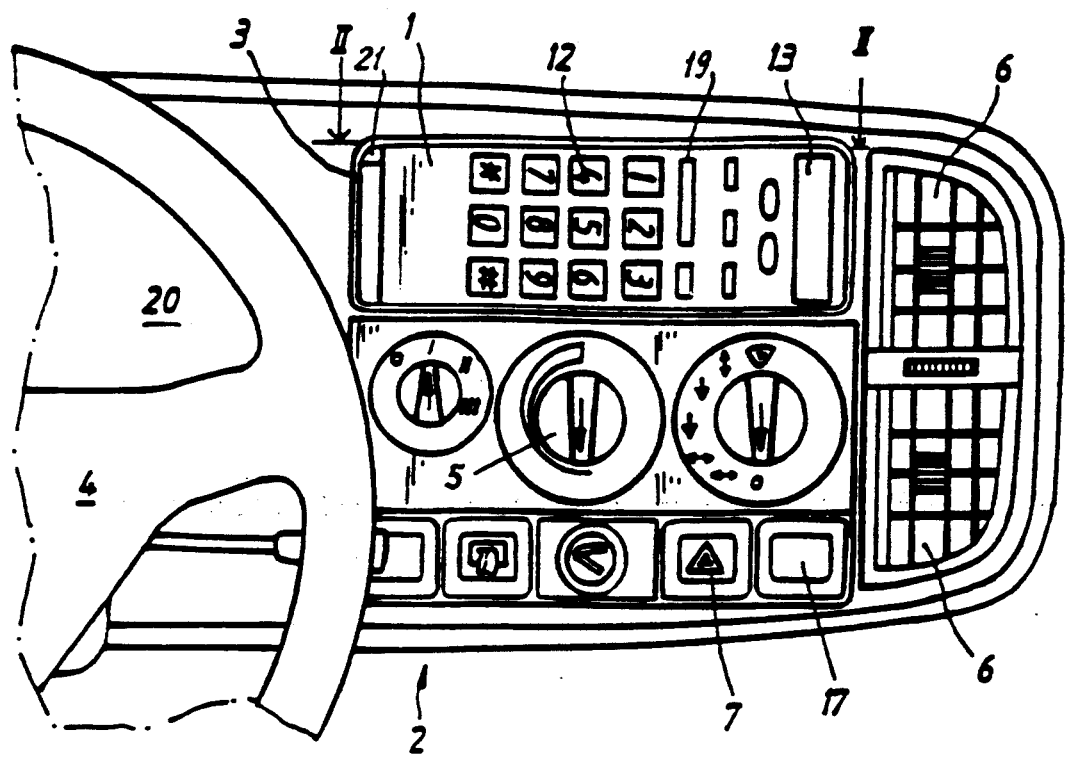
FIG. 1 shows a front view of an instrument panel on which a communications unit according to the invention is fitted, with its telephone receiver in a first user position.
Figure 2:
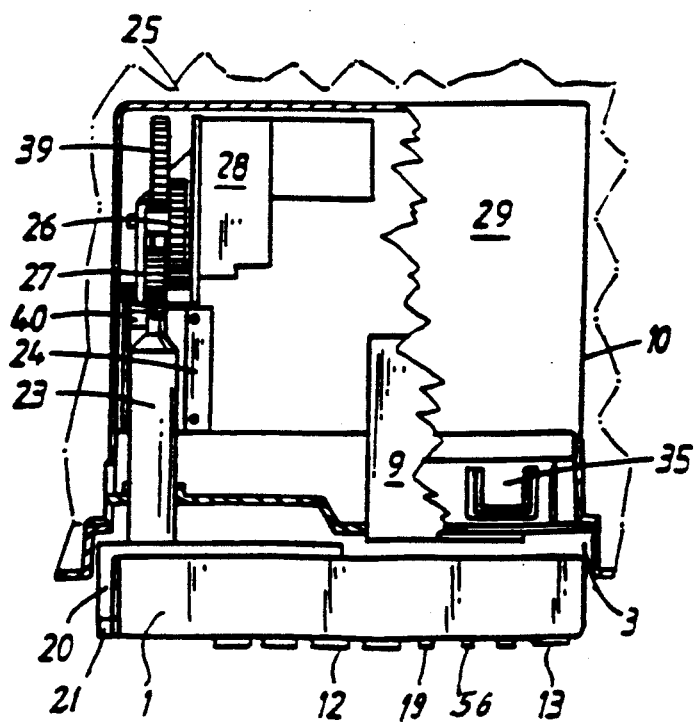
FIG. 2 shows a horizontal section II—II according to FIG. 1 with part of a protective casing for the base unit of the communications unit exposed.

FIG. 1 shows the instrument panel 2 of a vehicle. On the instrument panel 2 there are a number of controls 5 and a steering wheel 4. The controls are positioned in a so-called secondary zone, which is characterized by good accessibility and the fact that it can be viewed without the driver having to take his eyes completely off the road. The controls consist among other things of a ventilation control 5, a control for hazard lights 7 and a control for regulatable air discharge 6. In the secondary zone there is also a recess 3 of standardized design, for example in accordance with the DIN norm, for fitting of a radio set or similar equipment with a recess opening which extends horizontally and in the transverse direction of the vehicle. This recess 3 is used for fitting of a communications unit, preferably a so-called mobile telephone unit consisting of a base unit 10, a telephone receiver holder 20 and a telephone receiver 1. The telephone receiver 1 comprises a push-button set 12 and a function window 13 facing in towards the vehicle coupe. The telephone receiver 1 has in a conventional manner (not shown) a microphone and an earphone arranged integrated at each end of the elongate telephone receiver on the side opposite the push-button set 12. The telephone receiver 1 also comprises in a conventional manner the essential parts for telephoning from a vehicle. Attached FIG. 1 shows the telephone receiver 1 in a first user position. In this position the telephone receiver 1 is held in such a way that it extends horizontally and in the transverse direction of the vehicle in a first plane along and close to the base unit 10, where the push-button side as well as the microphone/earphone side of the telephone receiver are essentially parallel with this first plane. The base unit 10 is fitted recessed inside that surface of the instrument panel facing the coupe, so that the telephone receiver 1 in this position is protected in the recess, as emerges from FIG. 2. This means that unintentional actuation of the telephone controls 12 can be avoided to a greater extent than when the telephone receiver 1 is in too advanced a position relative to the other controls.

Figure 3:
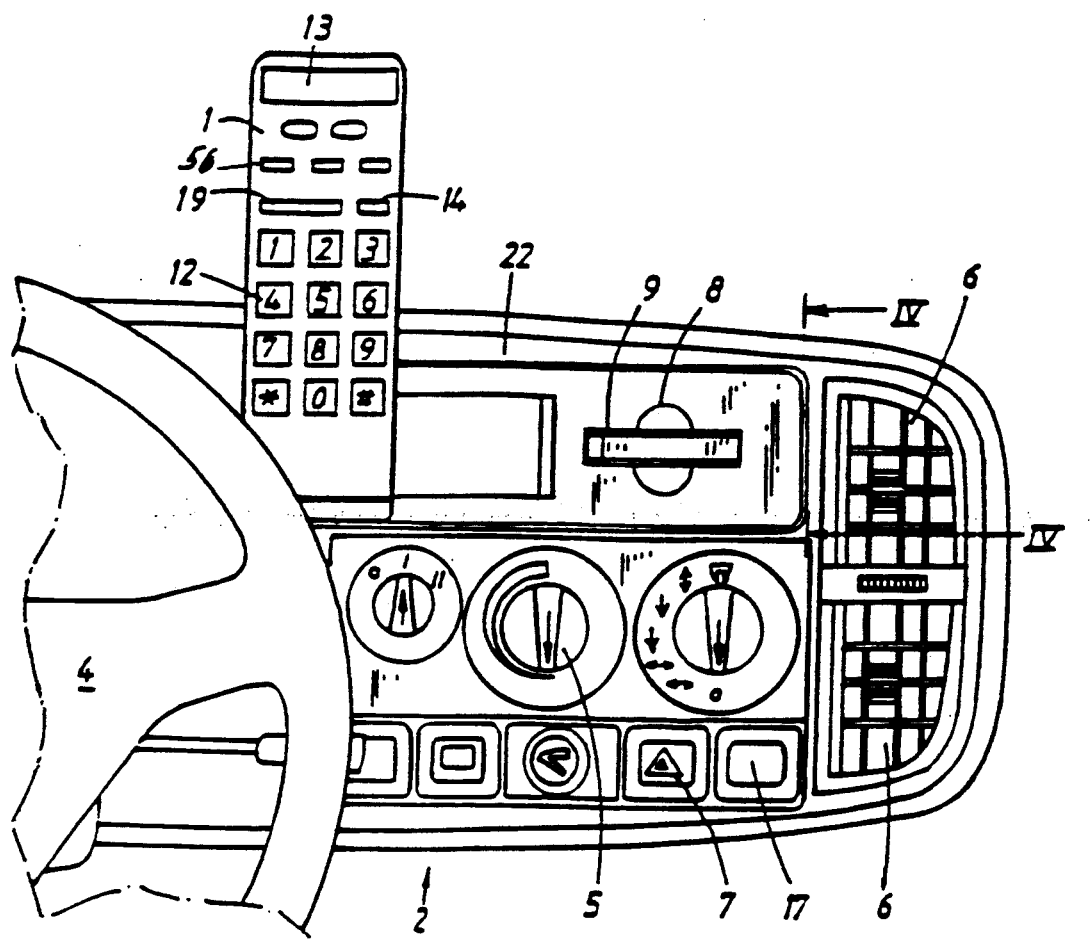
FIG. 3 shows a view according to FIG. 1 with the telephone receiver in a second user position.
Figure 4:
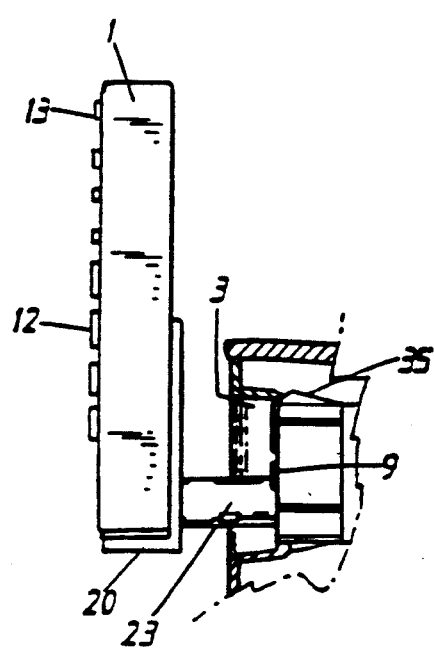
FIG. 4 shows a vertical section IV—IV according to FIG. 2.

In accordance with the present invention the telephone receiver 1 can be caused to assume a second user position, in which it is both ejected from the recess 3 and turned relative to the first position in such a way that the telephone receiver is turned upwards with its extent essentially at right angles to the first user position and parallel to the first plane. In this way, the push-button side of the telephone receiver retains the same direction towards the driver for the purpose of operating the telephone controls 12. The second position is shown in FIGS. 3 and 4. The holder 20 for the telephone receiver 1 is securely connected to one end of an ejector bar 23 incorporated in the base unit 10. This ejector bar 23 is designed in its axial extension at the end opposite the holder 20 with a gear rack 39 with partial-circle gear segments. The gear rack 39 cooperates with an electric motor 28 and a gear transmission 25, 26, 27 for axial displacement of the bar 23. The bar 23 is designed with a radially directed, fixed guide pin 40 which engages in a slidable manner in an S-shaped guide groove 44 in a guide rail 24 arranged concentrically around the bar 23. In this way the ejector bar 23 undergoes simultaneous turning during ejection. The circular gear segments on the gear rack 39 enable the ejector bar 23 to turn relative to an end cog 27 in the gear transmission 25, 26, 27 engaging with the gear segment. In this exemplary embodiment the bar 23 is turned 90° during the ejection. The circular gear segments are therefore only formed over a corresponding part of the periphery of the bar 23. If, in an alternative embodiment, the turning is effected about another angle, these gear segments should have an extension in the peripheral direction slightly exceeding the present angle range.

After a complete ejection of the holder 20, the telephone receiver 1 has an essentially vertical orientation as shown in FIGS. 3 and 4. In this position the telephone receiver 1 can be lifted out of the holder 20 or can be used held in this second user position. In this second position according to FIGS. 3 and 4, the front panel 22 of the base unit 10 is partly exposed. The front panel can here be designed with an accumulator compartment accommodating a reserve battery 9 for the telephone receiver 1. The reserve battery 9 is employed if, for example, the telephone receiver 1 is to be used outside the vehicle and the battery in the telephone receiver 1 has begun to lose power.

Figure 5:
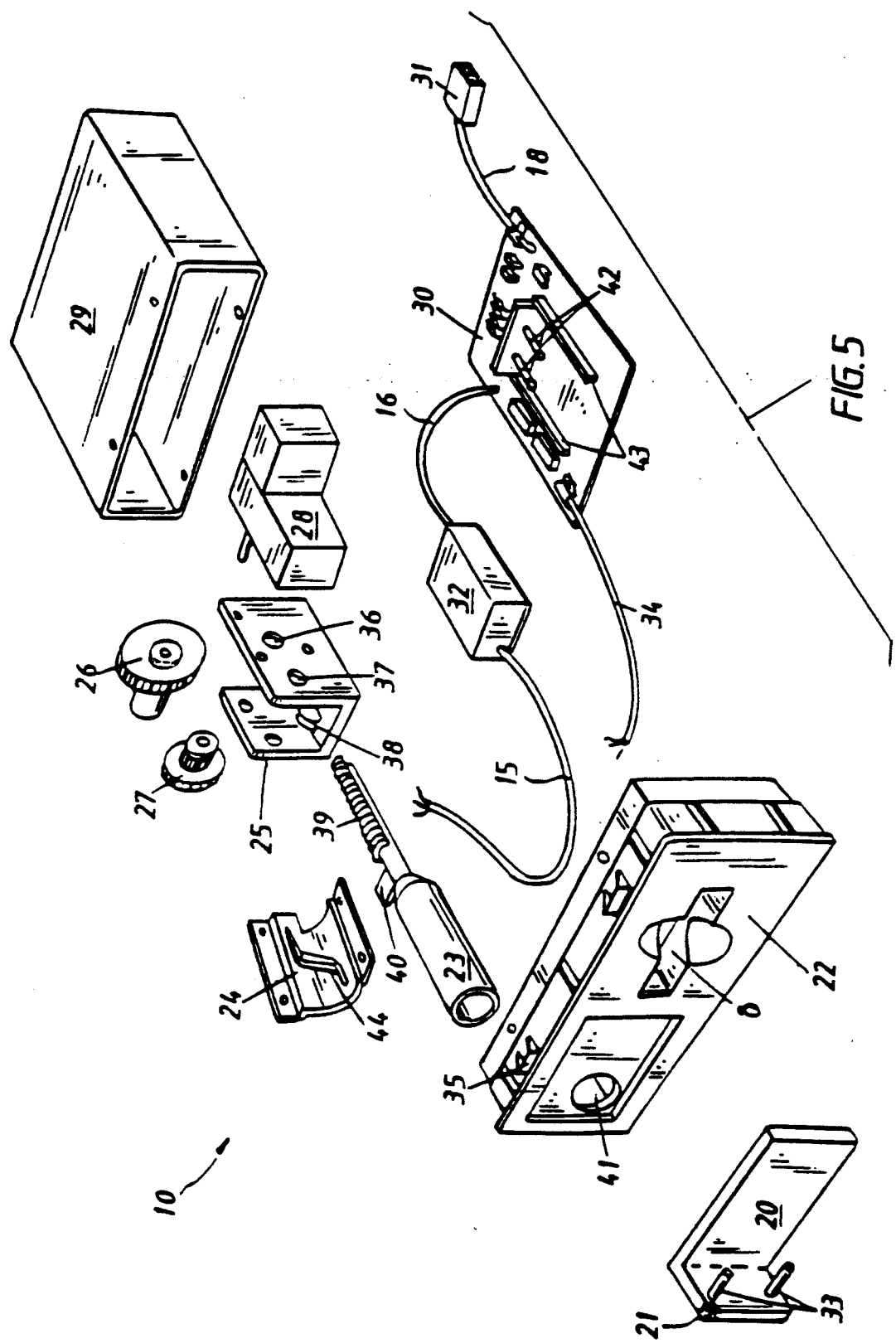
FIG. 5 shows an exploded view of the base unit of the communications unit.

The base unit 10 is shown in an exploded view in FIG. 5. In order for the base unit 10 to be held securely in the recess 3, the base unit 10 is designed with spring-back locking shoulders 35 which catch hold behind the recess opening 3.

The base unit 10 consists of a box-shaped protective casing 29 accommodating the ejector bar 23, the guide rail 24, the gear transmission 25, 26, 27, the gear rack 39 and the electric motor 28. Also included is a control unit 30 and regulator 32 for the operation of the electric motor 28.

The gear transmission consists of a bracket 25 in which there are arranged bearings 36 and 37 respectively for a cog wheel 26 driven by the electric motor 28 and for the end cog 27. The electric motor 28 is mounted on the bracket 25 with the cog wheel 26 mounted fixed in terms of rotation on the shaft of the electric motor 28. The cog wheel 26 engages with a cog section on the end cog 27 of smaller diameter, and a cog section of greater diameter on the end cog 27 engages with the gear rack 39. The bracket 25 is also designed with a guide shoulder 38 which bears on and centers the ejector bar 23 diametrically opposite the engagement point of the end cog 27 with the gear rack 39. The arcuate guide rail 24 is mounted concentric to the longitudinal axis of the ejector bar 23. The arcuate surface of the guide rail 24 comprises the S-shaped guide groove 44 in which the guide pin 40 on the ejector bar 23 is guided in a slidable manner. When the ejector bar 23 is driven out in the axial direction through a passage 41 in the front panel 22 under the action of the gear transmission 25, 26, 27, the guide groove 44 guides the guide pin 40 in such a way that the ejector bar 23 turns. In this way the holder 20 which is mounted fixed on the end of the ejector bar 23 is turned during simultaneous ejection.

The ejector bar 23 and its passage 41 in the front panel 22 are advantageously arranged near one of the corners of the recess 3. As a result of this eccentricity, the telephone receiver 1 is turned away from the recess 3 upon ejection in such a way that the accumulator compartment 8 in the front panel 22 is completely exposed.

The gear transmission 25, 26, 27 is driven by the electric motor 28 via the regulator unit 32. The regulator unit 32 can advantageously comprise current-limiting members which function in such a way that the electric motor 28 drives the ejector bar 23 to its end position, after which the current increases. This is detected by the regulator unit 32 which thereafter interrupts the current supply to the electric motor 28. The regulator 32 is coupled to the electric motor 28 via a cable 15 and via conventional connecting pins (not shown).

The regulator 32 is connected to the control unit 30 via a cable 16. A cable 34 leads from the control unit and extends inside through the ejector bar 23 from its inner gear rack end to the holder 20 mounted on the bar 23, where the cable 34 is connected to two coupling pins 33. The coupling pins 33 are used as securing members for the telephone receiver 1 and as signal transmission members between the control unit 30 and the telephone receiver 1. For example, an incoming call can give a signal to the control unit 30 for initiating ejection by activating the electric motor 28 for ejecting the bar 23. In other cases the driver can give a corresponding signal to initiate ejection by means of manual actuation of a function key 14 on the telephone receiver 1 or a function key 17 on the instrument panel 2. For insertion back to the first user position, the function keys 14, 17 are advantageously actuated again with the result that the electric motor 28 drives the ejector bar 23 in the opposite direction. The insertion can also be achieved by means of manual pressing and turning of the telephone receiver 1 to the first user position. By way of a cable 18 the control unit 30 can be coupled to other units in the car and to a current supply via a coupling device 31. An automatic ejecting function in the event of incoming calls can also be disconnected by means of a function key 19 on the telephone receiver 1.

The coupling device 31 can also be used for connection to equipment for so-called hands-free function, which can be selected with other function keys placed either on the telephone receiver 1, such as the function key 56, or on the instrument panel 2. The hands-free function makes it possible to conduct a telephone conversation without holding the telephone receiver 1 to the ear. For this purpose use is preferably made of a separate, fixed microphone 21 and a pair of loudspeakers (not shown), advantageously the same loudspeakers as used for a radio set which may be present in the vehicle.

In the embodiment illustrated, the microphone 21 is integrated in the holder 20. The microphone 21 can be directed towards the driver in one or both of the use positions.

On the control unit 30 there is also a fixed charging unit for the reserve battery 9. The reserve battery 9 is guided by means of guide rails 43 towards coupling pins 42 when the accumulator 9 is introduced into the battery compartment 8 in the front panel 22. In this way the reserve battery 9 can be stored with simultaneous maintained charging, so that a fully charged battery is at all times available.

Figure 6:
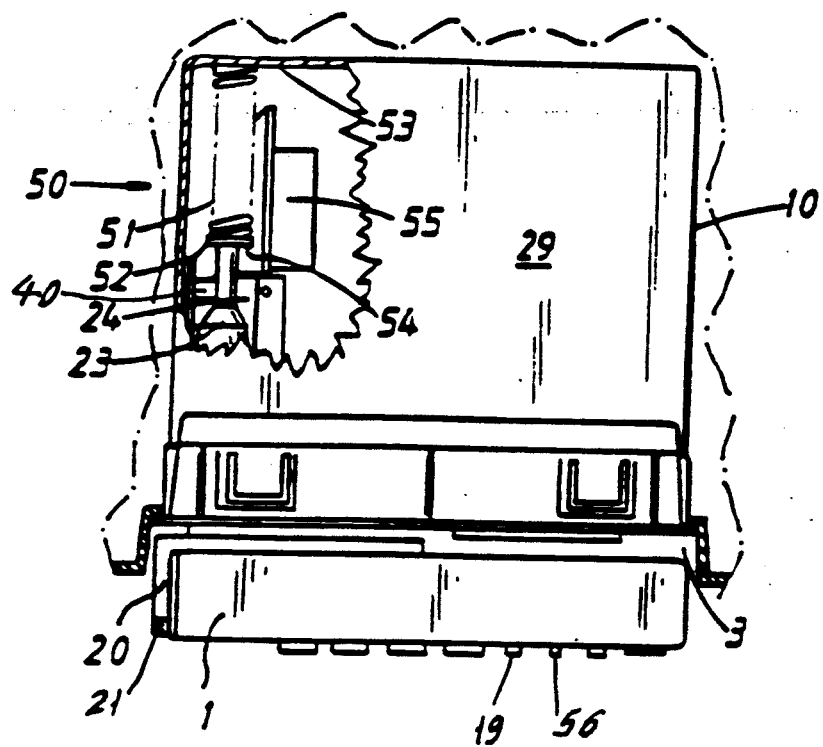
FIG. 6 shows an alternative drive unit for an ejection mechanism.

In an alternative embodiment as shown in FIG. 6 in accordance with the underlying concept of the invention, the gear transmission 25, 26, 27 and its electric motor 28 can be replaced by a simple spring mechanism 50. The spring mechanism 50 can advantageously consist of a cylindrical coiled spring 51 partially arranged concentrically on the ejector bar 23 and axially tensioned between a contact washer 52 arranged fixed on the ejector bar in the vicinity of its guide pin 40 and the base wall 53 of the protective casing 29. In this way the spring can be compressed manually and loaded upon insertion to the first user position, in which a locking hook 54 releasable by the control unit 30 locks the compressed spiral spring 51. Upon ejection, the locking hook 54 is first released by a release mechanism 55 controlled by the control unit, after which the spring 51 drives the ejector bar 23 out to the second end position corresponding to the second user position.

With the gear transmission shown, in a further alternative embodiment the ejecting force can also be achieved by means of a plain coiled spring arranged parallel to the cog wheel 26 and which, by means of direct connection to the shaft of the cog wheel 26, is pretensioned upon insertion.

The exemplary embodiment shown relates to a so-called mobile telephone for telephone conversations, but the inventive concept is also applicable to other similar communications equipment, such as, for example, hand pieces for communications radio sets. The invention should not be regarded as being limited to communications units which are securely fixed in the vehicle. The base unit 10 can also be fitted in a known manner in the recess 3 in a removable carrier.

We claim:

1. A communications unit for fitting into a recess in the instrument panel of a vehicle, the recess being so placed in the instrument panel and being so shaped as to open generally horizontally and in the transverse direction of the vehicle;

the communications unit comprising:
a base unit in the recess;
means holding an a telephone receiver having an elongated dimension in a first orientation in a first user position in the base unit and in the recess, the telephone receiver having one side which is held by the holding means essentially parallel to a first plane;
drive members in the base unit for ejecting the receiver out of the recess, the drive members further comprising guide means which guide the receiver to eject in a parallel displacement and in a turning movement and to move to a second user position, and the second user position is turned at an angle from the first user position and is generally parallel to the first user position.

2. The communications unit of claim 1, wherein the first user position is essentially horizontal with the elongated dimension of the telephone receiver horizontal; the guide means turning the telephone receiver upward to the second user position such that the elongated dimension of the telephone receiver extends essentially at right angles to the first orientation of the telephone receiver in the first user position, while the receiver is displaced parallel to its plane during movement from the first user position while being ejected from the base unit.

3. The communications unit of claim 1, wherein the holding means comprises a telephone receiver holder supported in the base unit and removably holding the telephone receiver; the drive members and the guide means act on the telephone receiver holder for thereby moving the telephone receiver.

4. A communications unit of claim 1, further comprising ejection initiation means connected with the drive members for initiating operation of the drive members for ejection of the receiver from the recess upon activation of the ejection initiation means.

5. The communications unit of claim 4, further comprising an electric motor connected with the drive members and activated by the initiation means for operating the drive members to eject the telephone receiver from the recess.

6. The communications unit of claim 4, wherein the drive members include a spring which is tensioned by the telephone receiver installed in the recess, the spring serving for ejecting the telephone receiver from the recess.

7. The communications unit claim 6, further comprising a fixed part in the base unit against which the spring is urged, an ejector in engagement with the spring and connected with the telephone receiver, and the ejector tensioning the spring against the fixed part when the telephone receiver is in the recess and in the first user position;

the ejection initiation means comprising a releasable initiation member for releasing the telephone receiver in the recess to enable the spring to move the ejector to eject the telephone receiver from the recess.

8. The communications unit of claim 1, wherein the drive members include an ejector secured to the telephone receiver and having a gear rack defined thereon; and a gear transmission, including a drivable gear engagable in the rack, such that upon driving of the drivable gear, the drivable gear drives the rack to drive the ejector to eject the telephone receiver from the recess.

9. The communications unit of claim 1, wherein the drive members include an ejector for the telephone receiver;

the guide means comprises a radially directed guide pin on the ejector; a guide rail arranged near the ejector, a guide groove in the guide rail which is normally engaged by the guide pin on the ejector, the guide groove having a path of extension along the guide rail and along the ejector, such that upon movement of the ejector along the guide groove during ejection of the telephone receiver from the recess, the guide groove imparts to the guide pin and to the ejector a turning movement which rotates the telephone receiver to the second user position.

10. The communications unit of claim 1, wherein the drive members include an ejector for the telephone receiver attached to the telephone receiver and to the drive members such that operation of the drive members operates the ejector for ejecting the telephone receiver out of the recess; the guide means being attached to the ejector.

11. The communications unit of claim 10, wherein the guide means comprises means for defining a guide path for turning the ejector and means on the ejector for engaging the guide path defining means for turning the ejector to the second user position as the ejector is ejecting the telephone receiver from the recess.

12. The communications unit of claim 8, wherein the gear rack includes gear segments thereon of sufficient circular extent around the ejector for enabling continuous engagement of the drivable gear of the gear transmission with the rack during turning of the ejector and the gear rack thereon caused by the guide means.

13. The communications unit of claim 4, wherein the ejection initiation means includes a manually actuatable release actuator connected with the drive members.

14. The communications unit of claim 4, wherein the ejection initiation means comprises a control unit for detecting an incoming telephone call to the telephone receiver, the control unit being connected with the drive members for activating the drive members, and a release actuator for releasing the telephone receiver from the recess and also being connected with the detector circuit for releasing the telephone receiver to be free to move out of the recess.

15. The communications unit of claim 1, further comprising a further recess in the base unit for a reserve battery for the telephone receiver, the further recess being positioned to be concealed and covered in the base unit by the telephone receiver when the telephone receiver is arranged in the recess in the first user position; the further recess including means for charging a reserve battery arranged in the further recess.

16. The communications unit of claim 1, further comprising an ejector attached to the telephone receiver and to the drive members, such that operation of the drive members operates the ejector for moving the telephone receiver out of the recess;

the recess in the instrument panel being essentially rectangular and more elongated in the horizontal direction and in the transverse direction of the vehicle; the ejector being positioned in the base unit to extend into the recess and to the telephone receiver toward one of the corners of the rectangular recess, such that when the telephone receiver on the ejector is ejected from the recess and upon rotation of the ejector, the telephone receiver is turned to the second user position; the ejector being so placed with the respect to the recess that with the telephone receiver in the second user position, the recess is accessible to a user.

17. The communications unit of claim 16, further comprising a further recess in the base unit for a reserve battery for the telephone receiver, the further recess being positioned to be concealed and covered in the base unit by the telephone receiver when the telephone receiver is arranged in the recess in the first user position and for being exposed when the telephone receiver is in the second user position;

the further recess including means for charging a reserve battery arranged in the further recess.

* * * * *